United States Patent [19]

Miller

[11] Patent Number: 5,503,110
[45] Date of Patent: Apr. 2, 1996

[54] PET LITTER SEPARATOR

[76] Inventor: George W. Miller, Rt. #2, Box 251, Eastanollee, Ga. 30538

[21] Appl. No.: 411,320

[22] Filed: Mar. 28, 1995

[51] Int. Cl.⁶ .................................................. A01K 1/035
[52] U.S. Cl. .......................................... 119/166; 209/374
[58] Field of Search ..................... 119/166, 167, 119/165; 209/379, 374, 355, 408, 384, 385, 614, 625, 674, 675

[56] References Cited

U.S. PATENT DOCUMENTS

| | | |
|---|---|---|
| 4,602,593 | 7/1986 | Gross . |
| 4,616,598 | 10/1986 | Burniski et al. ......................... 119/166 |
| 5,325,815 | 7/1994 | Gumpesberger ......................... 119/166 |

*Primary Examiner*—Todd E. Manahan
*Attorney, Agent, or Firm*—Gerald R. Boss; Cort Flint

[57] ABSTRACT

A pet litter separator including a container and a sifter for separating the unsoiled litter from the animal excrement and soiled litter. The sifter includes a stationery first sifter element for retaining the animal excrement and soiled litter within the container and a vertically movable second sifter element for separating the unsoiled litter from the animal excrement and soiled litter. A sifter mounts the second sifter element for relative vertical movement with respect to the first sifter element. A plurality of first sifter openings are defined within the first sifter element. The second sifter element has a first vertical position closing the first sifter openings thereby retaining litter within the container and a second vertical position unobstructing the first sifter openings enabling the unsoiled litter to pass through the first sifter openings. An actuator is interconnected with the sifter for moving the second sifter element from the first vertical position to the second vertical position.

18 Claims, 4 Drawing Sheets

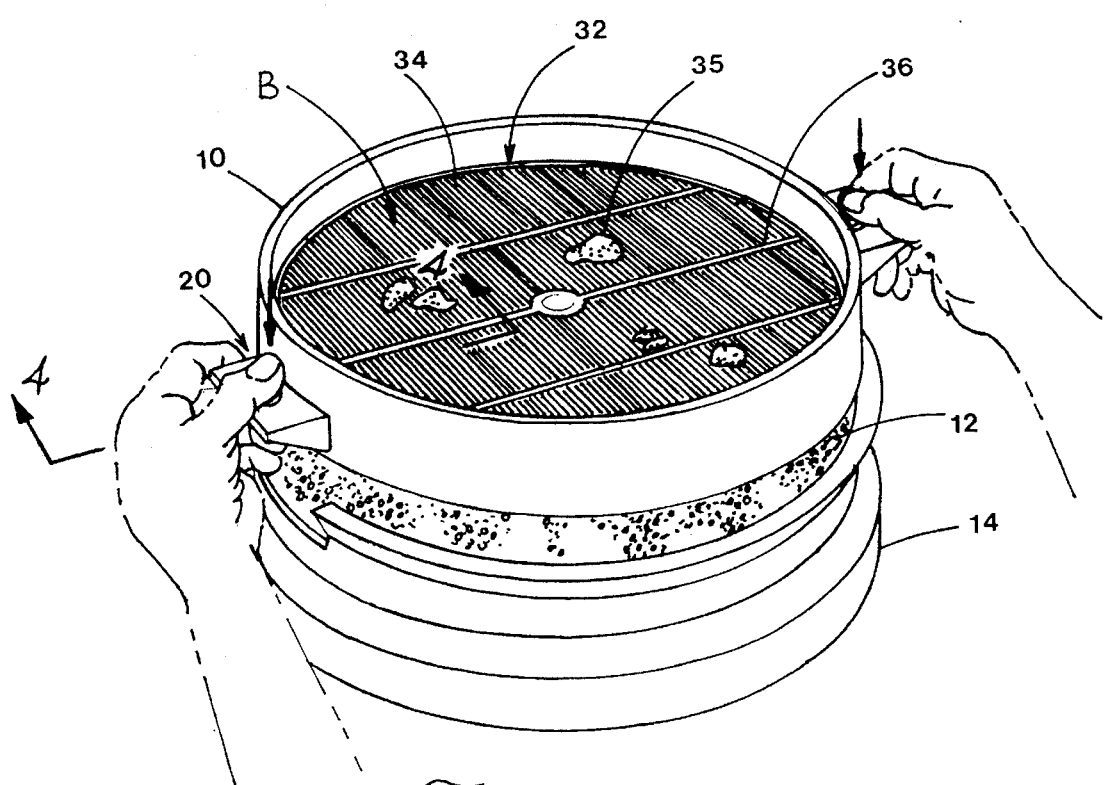
Fig. 3A
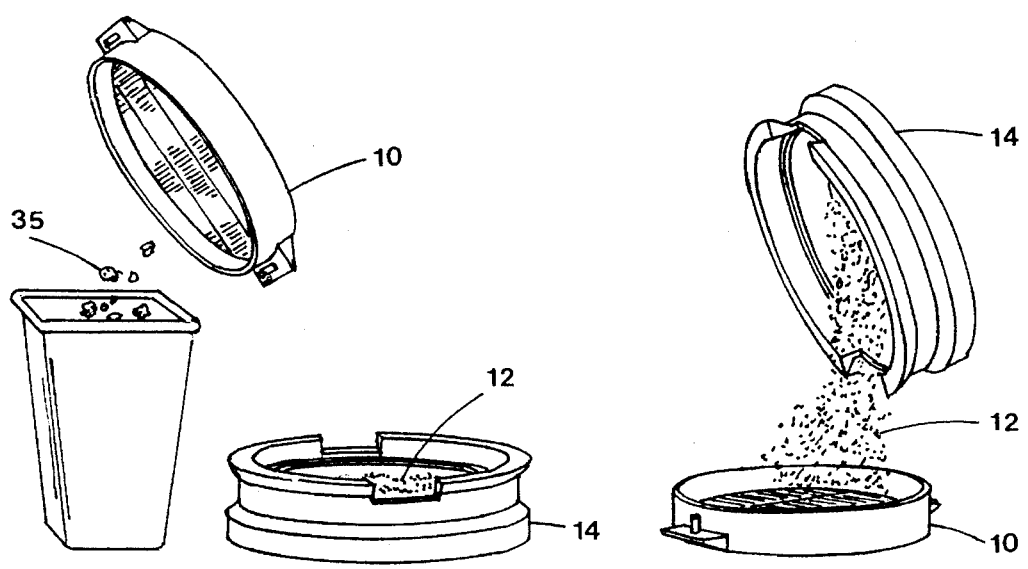
Fig. 3B
Fig. 3C

PET LITTER SEPARATOR

BACKGROUND OF THE INVENTION

This invention relates to pet litter boxes for containing soiled and unsoiled litter, and more particularly to a pet litter separator for sifting soiled and unsoiled litter thereby exposing the soiled litter for removal while passing the unsoiled litter to a container for subsequent reuse.

Many pet owners utilize litter boxes for their pets. In order to minimize the odor from the pet box and to provide a litter box which their pets will use, the pet owner is required to constantly clean the litter box removing pet excrement and litter coagulated from the pet's urine. Also, for economic reasons, the recycling of non-soiled litter is desired thereby minimizing the cost of replacing the litter.

Pet owners may use a device known as a "pooper scooper" whereby the pet owner scoops the excrement and soiled litter from the litter box. Utilization of the "pooper scooper" is an unpleasant task requiring the pet owner to scoop up the excrements and soiled litter at a close proximity. Furthermore, the scooping action generally breaks up the soiled litter and the excrements whereby some portions of the soiled litter and excrements are maintained within the litter box.

U.S. Pat. No. 4,602,593 discloses a pet litter box comprising of a pair of identically matingly stackable trays whereby each tray uses a horizontally moveable bottom panel. The horizontal movement of the bottom panel results in the inadvertent grinding of the excrements and soiled litter into small particles which are not removed from the unsoiled litter. This grinding results from the excrements and soiled litter resting on a panel which slides horizontally pushing the soiled litter against a tray slat breaking small particles from the soiled litter. Consequently, when the litter is sifted, the small quantities of soiled litter is retained with the unsoiled litter. Remnants of excrements and soiled litter within the box makes the litter box less effective in that the odor pervades and domestic animals will be less likely to use the litter box if it has been soiled.

Thus, it is undesirable to utilize a litter separator which incorporates a horizontal sifting movement due to the resulting grinding of the soiled litter and excrement into small particles which are not separated from the unsoiled litter.

Accordingly, an object of the present invention is to provide a pet litter separator utilizing a vertically moving separator for separating pet excrements and soiled litter from unsoiled litter enabling the unsoiled litter to be reused;

Additionally, it is an object of the present invention to provide a litter separator utilizing a vertically moving separator which is easy to operate to remove pet excrements and soiled litter from unsoiled litter enabling the unsoiled litter to be used over again.

SUMMARY OF THE INVENTION

The above objectives are accomplished according to the present invention by providing a pet litter separator for separating unsoiled litter from animal excrement and soiled litter. The litter separator includes a container having sidewalls for containing a quantity of litter. A sifter is carried by the container for separating the unsoiled litter from the animal excrement and clumped soiled litter. The sifter includes a stationery first sifter element for retaining the animal excrement and clumped soiled litter within the container and a vertically movable second sifter element for separating the unsoiled litter from the animal excrement and soiled litter. A sifter mounts the second sifter element for relative vertical movement with respect to the first sifter element. A plurality of first sifter openings are defined within the first sifter element. The second sifter element has a first vertical position closing the first sifter openings thereby retaining litter within the container. Also, the second sifter element has a second vertical position unobstructing the first sifter openings enabling the unsoiled litter to pass through the first sifter openings. An actuator is interconnected with the sifter for moving the second sifter element from the first vertical position to the second vertical position.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 3 consisting of FIGS. 3A through 3C illustrates a sequence wherein animal excrement is retained within the container and unsoiled litter is sifted to a receptacle, the excrement is discarded and the unsoiled litter is recycled to the container according to the invention;

DESCRIPTION OF A PREFERRED EMBODIMENT

Figure 1:
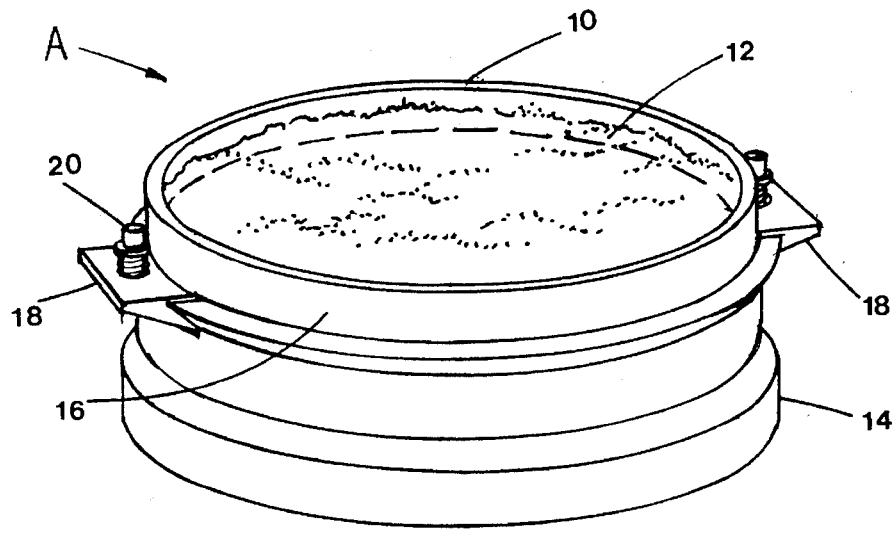
FIG. 1 is a perspective view of a pet litter separator according to the invention.

Referring now in more detail to the drawings, the invention will now be described in more detail. FIGS. 1 through 6 illustrate a pet litter separator device A for recycling unsoiled litter while providing for the removal of animal excrement and clumped soiled litter. Pet litter separator A includes a container 10 for retaining litter 12 and a base 14 disposed beneath container 10 for receiving unsoiled litter for subsequent reuse. Container 10 includes side wall 16 of a given height providing container 10 with depth to contain litter 12. Handles 18 which may be hollow are located on opposite sides of container 10 providing means to remove container 10 from base 12. Actuators 20 are carried by handles 18 and will be described in more detail in reference to FIGS. 4 and 6.

Figure 2:
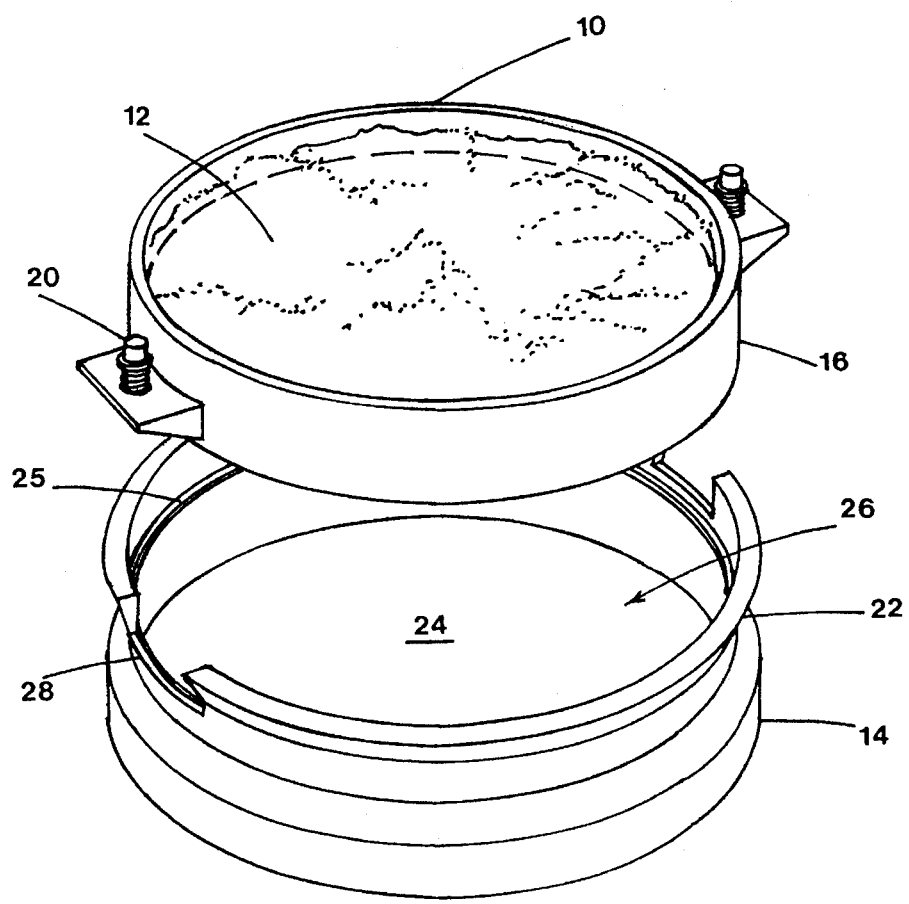
FIG. 2 is an exploded view illustrating the container and base receptacle according to the invention.

As shown in FIG. 2, base 14 includes base side wall 22 and base floor 24. Base side wall 22 extends upward from base floor 24 defining base receptacle 26. Base side wall 22 defines an open top leading into base receptacle 26. Interior flange 25 is carried by base side wall 22 along the interioral circumference of base receptacle 14. Base side wall 22 includes a plurality of indentures 28 of a size corresponding with handles 18. As shown in FIG. 1, container 10 is received within the interior of base 14. The bottom perimeter of container 10 abuts interior flange 24 and handles 18 abut indentures 28. In this position, unsoiled litter from container 10 will be received within base receptacle 26 for subsequent reuse. Of course, container 10 may be used with any base configuration for receiving unsoiled litter and in the preferred embodiment container 10 and base 12 are circular.

As illustrated in FIGS. 3A through 3C container 10 is used in conjunction with base 14 for recycling unused litter. Container 10 includes container interior 30. Sifter B is disposed within container interior 30 for separating unsoiled litter from animal excrement and clumped soiled litter. Sifter B includes a stationery first sifter element 32 which defines the container floor. Stationery first sifter element 32 defines a plurality of first sifter openings 34. First sifter openings 34 are sized to allow small particles of unsoiled litter to pass through while retaining clumped soiled litter and animal excrement within container interior 30. In the preferred embodiment, first sifter element 32 includes first spaced slats 33 made from plastic in a first horizontal slat pattern for retaining animal excrement and soiled litter 35 within container 10. Accordingly, to provide reinforcement for the slats to withstand the weight of an animal standing on first sifter element 32, ribs 36 traverse container interior 30. First spaced slats are interconnected with ribs 36 for transferring the weight of an animal to the container's sidewall.

Figure 4:
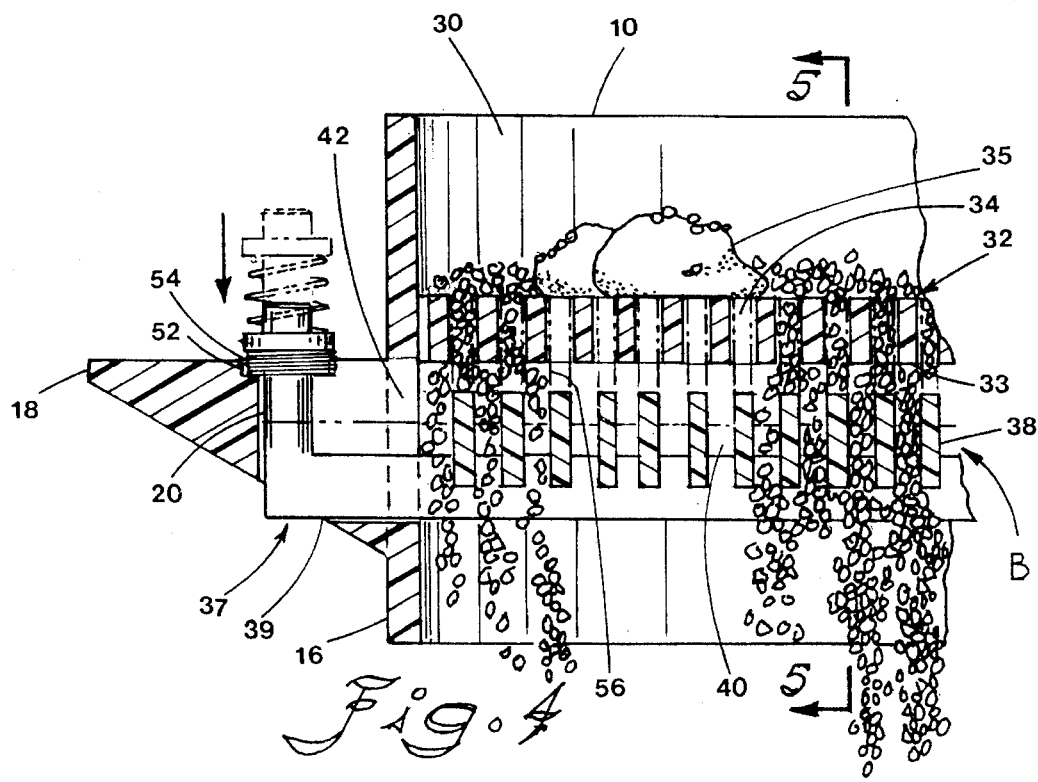
FIG. 4 is a cut-away view taken along line 4—4 of FIG. 3A illustrating a sifter sifting unsoiled litter to be recycled according to the invention.
Figure 6:
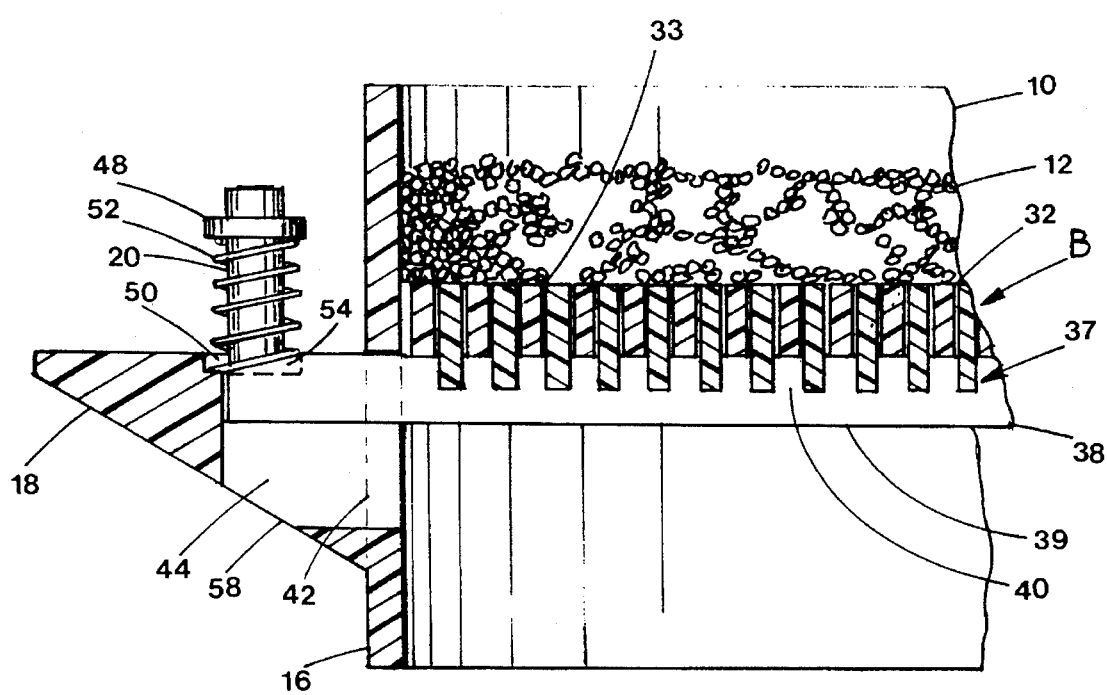
FIG. 6 is a cut-away view similar to FIG. 4 illustrating the litter retention position of the sifter for retaining litter within the container according to the invention.

As illustrated in FIGS. 4 and 6, sifter B includes a vertically movable second sifter element 37 carried by container 10 transversely across container interior 30. As shown in FIG. 6, second sifter element 37 has a first vertical position disposed beneath first sifter element 32 thereby closing first sifter openings 34 enabling litter to be contained within container 10. As shown in FIG. 4, second sifter element 37 has a second vertical position which opens first sifter openings 34 enabling litter to pass through first sifter openings 34.

In the preferred embodiment, sifting mount 39 caries second sifter element 37 which includes a plurality of second spaced slats 38. Second spaced slats 38 define a plurality of second sifter openings 40. Second spaced slats 38 are spaced horizontally offset from first spaced slats 33 in a second horizontal slat pattern which alternates with the first horizontal slat pattern of first spaced slats 33 enabling second sifter openings 40 to be horizontally offset from first sifter openings 34.

As illustrated in FIG. 6, the alternating horizontal offset configuration of second spaced slats 38 in the second horizontal slat pattern and first spaced slats 33 in the first horizontal slat pattern enables second spaced slats 38 to be received within first sifter openings 34 and first spaced slats 33 to be received within second sifter openings 40. When the top of sifting mount 39 is in its maximum vertical position abutting container side wall 16, second spaced slats 38 are horizontally planar with first spaced slat 33 thereby closing first sifter openings 34. Also, first spaced slats 33 close second slat openings 38 enabling litter to be retained by the container.

FIG. 6 illustrates the actuation mechanism for vertically positioning second spaced slats 38 with respect to first spaced slats 33. Container sidewall 16 defines sifting bar opening 42 leading into handle interior 44. Sifting mount 39 passes through container sidewall opening 42 into handle interior 44. Actuator 20 extends upward from sifting mount 39 through actuator opening 50 defined by the topside of handle 18. Handle seat 54 is concentric with actuator opening 50. Biasing means 52, which is preferably a spring, is carried by handle seat 54 and engages actuator lip 48 of actuator 20. The spring's tension biases actuator 20 upward resulting in positioning second spaced slats 38 vertically upward within first sifter openings 34. Actuator 20 in combination with biasing means 52 define a plunger mechanism which has an undepressed position which biases actuator 20 and sifting mount 39 upward. FIGS. 1, 2, and 6 illustrate bias means 52 biasing actuator 20 upward thereby placing second spaced slats 38 within first sifter openings 34 generally horizontally planar with first spaced slats 33 to define a litter retention position.

Figure 5:
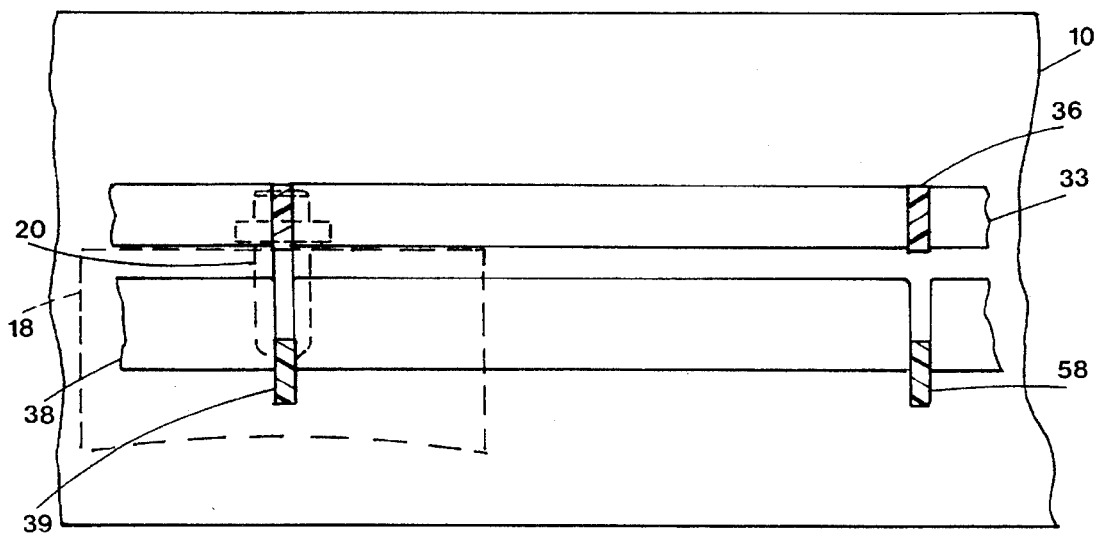
FIG. 5 is a cut-away view taken along line 5—5 of FIG. 4 illustrating that the second spaced slats of the sifter are notched for receiving a rib used to provide strength for the first spaced slats according to the invention.

As illustrated in FIG. 5, second spaced slats 38 are notched for receiving ribs 36 enabling second spaced slats 38 to extend upwards into a vertical position in horizontal alignment with first spaced slats 33. Also shown in FIG. 5 is second spaced slat rib 58 which provides strength for second spaced slats 38.

As shown in FIG. 4, actuator 20 may compress biasing means 52 for placing second spaced slats 38 into a litter sifting position. In the litter sifting position, second spaced slats 38 are positioned downwardly away from first sifter openings 34 along a vertical axis thereby opening first sifter openings 34. Also, with the positioning of second spaced slats 38 downwardly away from first spaced slats 33, first spaced slats 33 are removed from second sifter openings 40 unobstructing second sifter openings 40. In the litter sifting position, first sifter openings 34 and second sifter openings 40 are vertically and laterally spaced defining vertical sifting passages 56 which communicate unsoiled litter from container interior 30 to base receptacle 26. In the litter sifting position, second spaced slats 38 are disposed below first sifter openings 34 separating the downward flow of the unsoiled litter from the first slat openings between a pair of adjacent second slat openings defining a tortuous sifting passage. The spacing of first spaced slats 32 are of a size to retain soiled litter and excrement 35 within container 10. Gravity is utilized to force the unsoiled litter particles through the vertical sifting passages to the base receptacle. In the preferred embodiment, actuator 20 is positioned a predetermined distance away from container side wall 16 providing the operator with sufficient room to operate actuator 20. Accordingly, handle 18 may require handle opening 58 which will provide clearance for sifting mount 39 to be positioned downwardly.

As shown in FIGS. 4 and 6, the offset between the bottom of sifting mount 39 and the bottom of side wall opening 42 is of a greater length than the depth of floor openings 34. In this manner, the vertical displacement of second spaced slats 38 is of a length greater than the depth of first sifter openings 34 resulting in first sifter openings 34 becoming unobstructed when second spaced slats 38 are positioned downward in the litter sifting position by actuator 20.

By displacing second spaced slats 38 vertically downward, no horizontal force is applied to any soiled litter thereby avoiding the potential of breaking up soiled litter into particles small enough to pass through the sifting passages. Once the unsoiled litter has passed through vertical sifting passages 56, actuator 20 is released biasing second spaced slats 38 back into the litter retention position.

FIGS. 3A, 3B, 3C, 4 and 6 illustrate pet litter separator A in use. Actuator 20 is depressed thereby positioning second sifter element 37 vertically downward from first sifter element 32 thereby opening first sifter openings 34. Excrements 35 are retained by first sifter element 32 and unsoiled litter passes through first sifter openings 34 and second sifter openings 40 into base 12. Excrements 35 are discarded. Actuator 20 is undepressed thereby positioning second sifter element 37 within first sifter openings 34 thereby closing first sifter openings 34. Unsoiled litter is then dispensed from base 14 to container 10 for reuse.

While a preferred embodiment of the invention has been described using specific terms, such description is for illustrative purposes only, and it is to be understood that changes and variations may be made without departing from the spirit or scope of the following claims.

What is claimed is:

1. A pet litter separator for separating unsoiled litter particles from animal excrement and clumped soiled litter providing for removal of the excrement and clumped soiled litter while maintaining the unsoiled litter for recycled usage, said litter separator comprising:

a container having a sidewall and an interior for holding a quantity of litter;

a plurality of first spaced slats spaced across said interior of said container in a first horizontal slat pattern for retaining said animal excrement and soiled litter within said container;

a plurality of first slat openings defined between adjacent ones of said first spaced slats through which said unsoiled litter may pass;

a plurality of second spaced slats spaced across said interior of said container in a second horizontal slat pattern, said second slats being horizontally offset from said first spaced slats in said second slat horizontal pattern and disposed within said floor openings for containment of said litter;

a plurality of second slat openings defined between adjacent ones of said second spaced slats through which said unsoiled litter may pass;

a sifter mount carried by said container for mounting said second spaced slats for relative vertical movement with respect to said first spaced slats;

said second spaced slats having a first position in which said second spaced slats are received within said first slat openings to block said first slat openings and retain said litter within said container;

said second spaced slats being moveable to a second position vertically spaced from said first spaced slats along a vertical axis unobstructing said first slat openings;

a plurality of tortuous sifting passages defined by said first and second slat openings and said second spaced slats disposed below said first slat openings for channeling said unsoiled litter away from said container when said second spaced slats are in said second position, and said second spaced slats separating the downward flow of said unsoiled litter from said first slat openings between a pair of adjacent second slat openings; and an actuator carried by said container for moving said second spaced slats from said first position to said second position.

2. The litter separator of claim 1 wherein said actuator is comprised of a depressible plunger having an undepressed position for placing said second spaced slats in said first position, said depressible plunger having a depressed position for placing said second spaced slats in said second position.

3. The litter separator of claim 1 including a base receptacle disposed beneath said second spaced slats for receiving said unsoiled litter passing through said sifting passages.

4. The litter separator of claim 3 wherein said base receptacle includes a carrying means for carrying said container.

5. The litter separator of claim 3 wherein said base receptacle includes a base interior having a flange, said base interior receiving said container, said base flange carrying said container within said base interior.

6. The litter separator of claim 3 including handles carried by said container sidewall for positioning said container relative to said base receptacle.

7. The litter separator of claim 6 wherein said actuator is carried by at least one of said handles.

8. The litter separator of claim 6 wherein said base receptacle includes a base sidewall having indentures defined therein of a size corresponding with said handles for receiving said handles.

9. The litter separator of claim 1 wherein said sifter mount includes a sifting bar traversing said container interior carrying said second spaced slats, said actuator engaging said sifting bar for vertically positioning said second spaced slats relative to said first spaced slats.

10. The litter separator of claim 9 wherein said container sidewall defines a sifting bar opening enabling said sifting bar to pass from said container interior to an exterior of said container, said sifting bar opening having a depth greater than the depth of said first slat openings providing said sifting bar with sufficient vertical displacement to vertically displace said second spaced slats from said first slat openings.

11. The litter separator of claim 1 wherein said container is circular.

12. The litter separator of claim 1 wherein said first spaced slats are made from plastic, said first spaced slats interconnected by a support rib integral with said container sidewall for transferring the weight of an animal standing on said slats to said sidewall.

13. A pet litter separator for separating unsoiled litter from animal excrement and clumped soiled litter providing for removal of the excrement and clumped soiled litter, said pet litter separator comprising:

a container having sidewall for containing a quantity of litter;

a sifter carried by said container for separating said unsoiled litter from said animal excrement and soiled litter, a stationary first sifter element included in said sifter for retaining said animal excrement and soiled litter within said container;

a vertically moveable second sifter element included in said sifter for separating said unsoiled litter from said animal excrement and soiled litter;

a sifter mount carried by said container for mounting said second sifter element for relative vertical movement with respect to said first sifter element;

a plurality of first sifter openings defined within said first sifter element;

said second sifter element having a first vertical position closing said first sifter openings for retaining litter within said container;

said second sifter element having a second vertical position unobstructing said first sifter openings enabling said unsoiled litter to pass through said first sifter openings; and an actuator interconnected with said sifter for moving said second sifter element from said first vertical position to said second vertical position.

14. The litter separator of claim 13 wherein said second sifter element includes a plurality of second sifter openings through which said litter may pass, one of said first sifter openings and one of said second sifter openings being vertically spaced and laterally offset defining a vertical sifting passage when said second sifter element is in said second vertical position enabling said unsoiled litter to pass from said container through said sifter.

15. The litter separator of claim 14 including a base receptacle disposed below said vertical sifting passage for receiving a quantity of unsoiled litter.

16. The litter separator of claim 15 wherein said base receptacle includes a carrying means for carrying said container.

17. The litter separator of claim 13 wherein said actuator includes a depressible biasing means having an undepressed position for placing said second sifter element in said first vertical position and said depressible plunger having a depressed position for placing said second sifter element in said second vertical position.

18. The litter sifter of claim 13 wherein said second sifter element is received by said first sifter openings in said first vertical position thereby obstructing said first sifter openings.

* * * * *